United States Patent Office 3,280,771
Patented Oct. 25, 1966

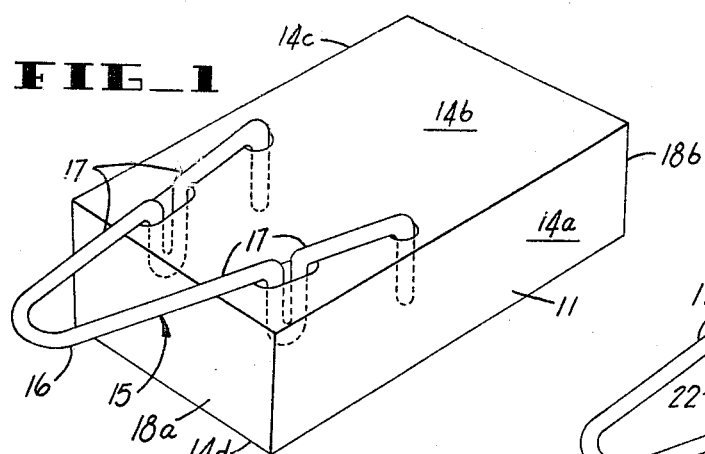
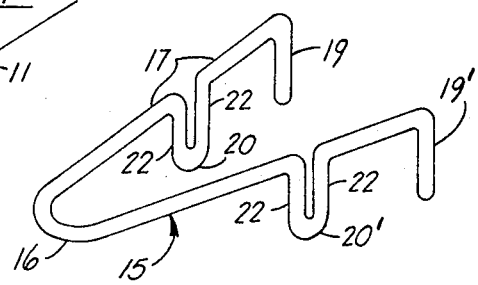
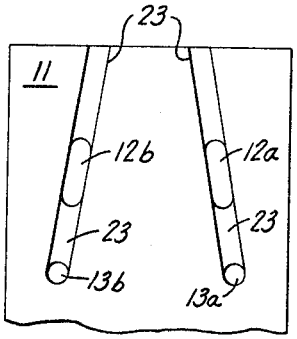
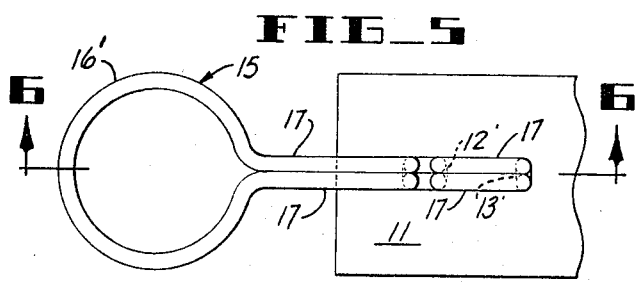
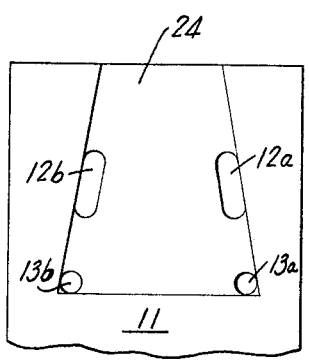
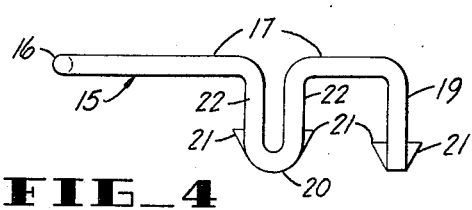
INVENTORS
DONALD C. BURKLO
BY CHARLES H. MILLER

3,280,771
SUSPENDED REFRACTORY UNITS
Donald C. Burklo, Columbiana, and Charles H. Miller, Youngstown, Ohio, assignors to Kaiser Aluminum & Chemical Corporation, Oakland, Calif., a corporation of Delaware
Filed Oct. 19, 1964, Ser. No. 404,692
13 Claims. (Cl. 110—99)

This invention concerns refractories and particularly shaped refractories adapted to be suspended from an external support.

In recent years there has been increasing use of basic or non-acid refractories, particularly non-acid oxide refractories such as those made from magnesite, periclase, chromite, magnesia spinals, dolomite, and the like, and from mixtures of two or more of these. However, because of the strength characteristics of such refractory materials at high temperatures, it is often necessary, when constructing a furnace, for example the roof of an open hearth steel making furnace, of such materials, to provide individual support for each refractory shape or brick.

When such refractory shapes are used in the unfired or chemically bonded condition, a hanger adapted to be engaged by an external support can be co-molded into the refractory material at the time the brick or shape is formed. However, in the case of fired refractories, the co-molding method of attaching a hanger is not available. It is known to attach hangers to fired refractory brick by attaching the hanger to a metal casing this casing then being attached to the outside of the fired shape, as by welding, strapping, or the like. However, there is a substantial demand for fired, uncased, non-acid refractory shapes which can be suspended from an external support and the refractories industry is faced with the problem of attaching hangers to such shapes.

There has now been discovered, according to this invention, a refractory unit and hanger therefor wherein the hanger can be attached to the refractory shape after it has been formed, and even after it has been fired if desired, said hanger not requiring the use of an external metal casing to keep it attached to the refractory.

It will be understood that the hanger should remain attached to the refractory shape during construction and operation of the furnace in which the shape is used and that the hanger should not allow the refractory shape to drop, after it has been installed in a furnace roof for example, causing damage to the structure.

This invention will be more fully understood from the following description taken in conjunction with the drawings in which:

FIGURE 1 is a perspective view of a refractory unit according to this invention;

FIGURE 2 is a perspective view of one embodiment of the hanger according to this invention;

FIGURE 3 is a partial plan view of a refractory shape for use in one embodiment of this invention;

FIGURE 4 is a side view of another form of the hanger of this invention;

FIGURE 5 is a plan view of an alternative embodiment of the refractory unit according to this invention;

FIGURE 6 is a sectional view along the line 6—6 of FIGURE 5; and

FIGURE 7 is a view similar to FIGURE 3 showing an alternative embodiment.

In constructing a refractory unit according to a preferred embodiment of this invention, a refractory shape 11 having four lonigtudinal side faces 14a, 14b, 14c, and 14d and two end faces 18a and 18b is formed with recesses 12a and 12b and 13a and 13b in one face thereof. A hanger 15 is formed of heat resistant metal wire or rod, stainless steel being a preferred material. The hanger 15 is of a generally U or hairpin configuration, having a crosspiece 16 adapted to be engaged by an external support and two arms 17 attached to opposite ends of the crosspiece 16 and disposed on the same side thereof, that is to say, extending therefrom generally in the same direction. At the end of arms 17 remote from the ends attached to the crosspiece 16, end legs 19 and 19' are formed by bending or forming down the wire or rod of hanger 15 so that the legs 19 and 19' are approximately perpendicular to the axes of arms 17. The legs 19 and 19' extend in the same general direction from the arms 17; that is to say, they are disposed on the same side of the hanger 15. Intermediate the ends of each arm 17 are formed U-shaped or re-entrant elements or sections or legs 20 and 20' made by bending the wire of the hanger 15 into a U-form so that the U-sections comprise two side elements 22 which are roughly parallel to each other.

The refractory unit is assembled by driving the legs 19 and 19' and U-sections 20 and 20' into the preformed recesses 13a and 13b and 12a and 12b, respectively, of the refractory shape 11. The hanger 15 is retained on the refractory shape 11 by one or more of the following means:

First, the two side elements 22 of the U-sections 20 and 20' are so proportioned and shaped and the recesses 12a and 12b so sized that when the U-sections 20 and 20' are forced into the recesses 12a and 12b, the two side elements 22 of the U-sections 20 and 20' are compressed towards each other. Thus, the two side elements 22 of the U-sections will bear in frictional engagement against the refractory material along the sides of the recesses 12a and 12b, that is to say against the surfaces of the recesses perpendicular to the side face of the refractory shape.

Second, the end legs 19 and 19' and U-sections 20 and 20' are so formed and the distance between them so proportioned with respect to the distance between the recesses 12a and 12b and 13a and 13b that when the legs 19 and 19' and 20 and 20' are forced into the recesses 13a and 13b and 12a and 12b the end legs 19 and 19' and the U-sections 20 and 20' are forced slightly apart, thus providing springing engagement between the legs and the refractory material at the sides of the recesses. It will be understood that it is possible to make the end legs 19 also in U-shape or form and that the forcing of such U-shaped end legs 19 into recesses 13 will also assist in retaining the hanger 15 on refractory shape 11.

Third, the arms 17 of the hanger 15 are so formed with respect to the crosspiece 16, and the holes 12a and 12b and 13a and 13b are so spaced, that in order to insert the legs 19 and 19' and 20 and 20' into the recesses 13a and 13b and 12a and 12b it is necessary to force the arms 17 together. Thus, when the hanger 15 is inserted into the recesses in refractory shape 11 there is additional frictional engaging force against the sides of the recesses by the metal of the hanger.

Fourth, to assist in maintaining attachment of the hanger 15 to the refractory shape 11, barbs or prongs 21 can be placed on the sides of legs 19 and 20, as shown in FIGURE 4. The prongs or barbs are disposed in a rearwardly extending slanted position with respect to the axis or surface of the legs so that their points will slide over the refractory when the legs are inserted but will bite into the refractory if the legs tend to move out of the recess.

It will be understood that more secure retention of the hanger 15 in the refractory shape 11 will be obtained if two or more of the above mentioned hanger retaining methods are used in making the refractory unit according to this invention.

It will be understood that the problem of retaining the legs 19 and 20 in the recesses 13 and 12 is made more difficult by the fact that, in order to form the refractory shape 11, for example by pressing, it is usually necessary to form the recesses 12 and 13 with a slight inward taper, that is with the bottoms or innermost portion of the recesses of smaller size than the top or outer portion. This is in order that the portion of the mold or die forming the recess can be removed therefrom after the forming operation without tearing or breaking portions of the refractory around the recess. If desired, the recesses 12 and 13 can be made as straight cylinders by drilling the refractory, but such method of forming the recesses will generally be found more expensive.

In addition to the recesses 12 and 13, the face of the refractory shape 11 can have grooves 23 therein for receiving arms 17 of hanger 15. Such grooves 23 are particularly useful in suspending the refractory shape 11 where a close fit between adjacent refractory shapes 11 is desired. For ease of forming the refractory shape, it may be desired to omit refractory material from the space between grooves 23 to the depth of the grooves, thus forming a "dove-tail" recess 24, as shown in FIGURE 7. It will be understood that refractory shape 11 can, if desired, be covered with a metal casing after hanger 15 has been put in place.

FIGURE 5 shows an alternative embodiment wherein, instead of four recesses 12a and 12b and 13a and 13b, there are only two recesses 12' and 13' in the face of refractory shape 11. In this embodiment, in order to insert hanger 15 into refractory shape 11, arms 17 must be forced into a side-by-side position. Thus the legs 19 and 20 will be in springing engagement with the recesses and, in the case where the arms 17 are disposed within a groove corresponding to the grooves 23, the arms 17 will also be in springing engagement with the sides of the groove. In this embodiment, the crosspiece can take the form of a ring 16' adapted to engage an external support.

It is an advantage of this invention that, by it, there can be formed a refractory unit adapted to be suspended from an external support in which the hanger can be attached to the refractory material after the refractory has been formed, and even after it has been fired, without the use of external metal casings or straps. It is also an advantage of this invention that it provides a hanger structure securely affixed or attached to a refractory shape. Such refractory units are particularly useful in constructing high temperature furnace roofs, for example the roof of an open hearth steel making furnace, and can also be used wherever suspended or anchored refractory construction is desired. Again, while the structure of this invention is particularly useful for refractory shapes made of non-acid refractories such as magnesite, periclase, chromite, and the like, it will be understood that this method of suspension can be used with refractories of any chemical composition. While the drawings show the use of this invention with rectangular refractory shapes, it will be understood that it is equally applicable to non-rectangular, for example tapered or wedged, shapes and to even more complicated shapes.

The above description of this invention is by way of example and illustration, the exact scope of the invention being defined in the appended claims.

What is claimed is:

1. A refractory unit comprising: a preformed refractory shape having a plurality of preformed recesses in one face thereof; and hanger means comprising a crosspiece and two arms attached to opposite ends of said crosspiece and extending generally in the same direction therefrom, each arm having two ends, an outwardly extending end leg at the end thereof remote from the end attached to said crosspiece, and a U-shaped section intermediate the ends thereof and extending in the same direction as said end leg; each of said end legs and said U-sections being disposed in said preformed recesses when said unit is assembled.

2. A refractory unit according to claim 1 wherein an external metal plate covers the face of the refractory shape containing the preformed recesses and said hanger means.

3. A refractory unit according to claim 1 wherein said end legs and said U-sections are disposed in four preformed recesses.

4. A refractory unit comprising: a preformed refractory shape having side faces and end faces and a plurality of preformed recesses in one side face thereof adjacent one end of said side face; and hanger means comprising a crosspiece and two arms attached to opposite ends of the crosspiece and extending generally in the same direction therefrom, each arm having two ends, an outwardly extending end leg at the end thereof remote from the end attached to said crosspiece, and a U-shaped section intermediate the ends thereof and extending in the same direction as said end legs; each of said end legs and said U-sections being disposed in said preformed recesses, and said arms being compressed toward each other when said unit is assembled.

5. A refractory unit according to claim 4 wherein said end legs and said U-sections are disposed in four preformed recesses.

6. A refractory unit comprising: a preformed refractory shape having a plurality of preformed recesses in one face thereof; and hanger means comprising a crosspiece and two arms attached to opposite ends of said crosspiece and extending generally in the same direction therefrom, each arm having two ends, an outwardly extending end leg at the end thereof remote from the end attached to said crosspiece, and a U-shaped section, comprising two side elements, intermediate the ends thereof and extending generally in the same direction as said end legs; each of said end legs and said U-sections being disposed in said preformed recesses, the side elements of said U-sections being compressed toward each other when in said preformed recesses.

7. A refractory unit according to claim 6 wherein said end legs and said U-sections have prongs engaging the refractory in said preformed recesses.

8. A refractory unit comprising: a preformed refractory shape having a plurality of preformed recesses in one face thereof; and hanger means comprising a crosspiece and two arms attached to opposite ends of said crosspiece and extending generally in the same direction therefrom, each arm having two ends, an outwardly extending end leg at the end thereof remote from the end attached to said crosspiece, and a U-shaped section intermediate the ends thereof and extending in the same direction as said end legs; each of said end legs and said U-sections being disposed in said preformed recesses, said end legs being sprung away from said U-sections when said legs are in said preformed recesses.

9. A refractory unit according to claim 8 wherein said end legs and said U-sections are disposed in four preformed recesses.

10. A refractory unit adapted to be suspended from an external support comprising: a fired refractory shape having a plurality of preformed recesses in one face thereof; and wire hanger means comprising a crosspiece adapted to be engaged by an external support and two arms attached to opposite ends of said crosspiece and extending generally in the same direction therefrom, each arm having two ends, an outwardly extending end leg at the end thereof remote from the end attached to the crosspiece, and a U-shaped section, comprising two side elements, intermediate the ends thereof and extending in same direction as said end legs; each of said end legs and said U-sections being disposed in said preformed recesses, the side elements of said U-sections being compressed toward each other when in said preformed recesses, said end legs being sprung away from said U-sections when said legs are in said preformed recesses, said arms being compressed toward each other, and said end legs and said U-sections having prongs engaging the refractory in said preformed recesses when said unit is assembled.

11. A refractory unit according to claim 10 wherein said refractory shape is made of non-acid oxide refractory.

12. A refractory unit according to claim 10 wherein an external metal plate covers the face of the refractory shape containing the preformed recesses.

13. A refractory unit according to claim 10 wherein said end legs and said U-sections are disposed in four preformed recesses and said arms are disposed in grooves in said face of said refractory, said grooves extending from one end of the refractory past the recesses in which the U-sections are disposed and at least to the recesses in which said end legs are disposed.

References Cited by the Examiner

UNITED STATES PATENTS

| | | |
|---|---|---|
| 1,076,240 | 10/1913 | Schuffenhaver. |
| 2,398,622 | 4/1946 | Crncich _____ 110—99 X |
| 3,029,755 | 4/1962 | Crichton _____ 110—99 |
| 3,234,703 | 2/1966 | Sullivan _____ 52—509 |

FOREIGN PATENTS

| | | |
|---|---|---|
| 601,872 | 7/1960 | Canada. |
| 776,901 | 11/1934 | France. |
| 56,074 | 5/1911 | Switzerland. |

FREDERICK L. MATTESON, JR., *Primary Examiner.*

R. A. DUA, *Assistant Examiner.*